(12) United States Patent
Connell, II et al.

(10) Patent No.: US 10,216,995 B2
(45) Date of Patent: Feb. 26, 2019

(54) SYSTEM AND METHOD FOR GENERATING AND EMPLOYING SHORT LENGTH IRIS CODES

(75) Inventors: Jonathan H. Connell, II, Hawthorne, NY (US); James E. Gentile, Hawthorne, NY (US); Nalini K. Ratha, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 2179 days.

(21) Appl. No.: 12/567,303

(22) Filed: Sep. 25, 2009

(65) Prior Publication Data

US 2011/0075892 A1    Mar. 31, 2011

(51) Int. Cl.
- *G06T 7/12* (2017.01)
- *G06K 9/00* (2006.01)
- *G06K 9/62* (2006.01)
- *G06F 17/30* (2006.01)
- *G06K 9/46* (2006.01)

(Continued)

(52) U.S. Cl.
CPC ..... *G06K 9/00617* (2013.01); *G06F 17/3028* (2013.01); *G06F 17/30256* (2013.01); *G06K 9/00899* (2013.01); *G06K 9/4671* (2013.01); *G06K 9/52* (2013.01); *G06K 9/623* (2013.01); *G06T 7/11* (2017.01); *G06K 2009/4666* (2013.01); *G06T 7/12* (2017.01); *G06T 2207/20112* (2013.01); *G06T 2207/30196* (2013.01)

(58) Field of Classification Search
CPC .......... G06T 7/0012; G06T 7/0083; G06T 2207/30004; G06T 7/0081; G06F 19/321
USPC .......................................................... 382/128
See application file for complete search history.

(56) References Cited

U.S. PATENT DOCUMENTS 5,291,560 A * 3/1994 Daugman .................... 382/117
6,247,813 B1   6/2001 Kim et al.
(Continued)

FOREIGN PATENT DOCUMENTS

JP  2002269565 A   9/2002
JP  2004167227 A   6/2004
(Continued)

OTHER PUBLICATIONS

Chin, C., et al. High Security Iris Verification System Based on Random Secret Integration, Computer Vision and Image Understanding. INSPEC. Mar. 2006. pp. 169-177.
(Continued)

*Primary Examiner* — Tran N Nguyen
(74) *Attorney, Agent, or Firm* — Tutunjian & Bitetto, P.C.; Rabin Bhattacharya

(57) ABSTRACT

A system and method for generating compact iris representations based on a database of iris images includes providing full-length iris codes for iris images in a database, where the full-length iris code includes a plurality of portions corresponding to circumferential rings in an associated iris image. Genuine and imposter score distributions are computed for the full-length iris codes, and code portions are identified that have a contribution that provides separation between imposter and genuine distributions relative to a threshold. A correlation between remaining code portions is measured. A subset of code portions having low correlations within the subset is generated to produce a compact iris representation.

9 Claims, 9 Drawing Sheets

(51) Int. Cl.
G06K 9/52 (2006.01)
G06T 7/11 (2017.01)
G06T 7/13 (2017.01)

(56) References Cited

U.S. PATENT DOCUMENTS

| | | |
|---|---|---|
| 6,526,160 B1 | 2/2003 | Ito |
| 6,871,287 B1 | 3/2005 | Ellingson |
| 7,269,277 B2 | 9/2007 | Davida et al. |
| 7,272,245 B1 | 9/2007 | Layton |
| 7,277,561 B2 | 10/2007 | Shin |
| 7,331,667 B2 | 2/2008 | Grotehusmann et al. |
| 7,444,007 B2 | 10/2008 | Schonberg et al. |
| 7,483,569 B2 | 1/2009 | Bhagavatula et al. |
| 9,483,696 B2 | 11/2016 | Connell, II |
| 2006/0015492 A1* | 1/2006 | Keating et al. ............ 707/4 |
| 2006/0117188 A1 | 6/2006 | Fiske |
| 2007/0211924 A1 | 9/2007 | Hamza |
| 2008/0037835 A1* | 2/2008 | Lee et al. .............. 382/117 |
| 2008/0126809 A1 | 5/2008 | Rothschild |
| 2008/0219515 A1* | 9/2008 | Namgoong ............ 382/117 |
| 2009/0016574 A1 | 1/2009 | Tsukahara |
| 2009/0161923 A1 | 6/2009 | Kondo et al. |
| 2012/0328166 A1 | 12/2012 | Connell, II |

FOREIGN PATENT DOCUMENTS

| | | |
|---|---|---|
| JP | 2009077259 A1 | 4/2009 |
| TW | 555547 B | 10/2003 |
| TW | 200905577 A | 2/2009 |
| WO | WO2009034498 A1 | 3/2009 |

OTHER PUBLICATIONS

Deering. A Photon Accurate Model of the Human Eye. Proceedings of ACM SIGGRAPH 2005. ACM Digital Library. Jul. 2005. pp. 649-659.
Dozier, et al. Minimizing the Number of Bits Needed for Iris Recognition Via Bit Inconsistency and Grit. IEEE Workshop on Computational Intelligence in Biometrics: Theory, Algorithms, and Applications, 2009. CIB 2009. INSPEC/IEEE. Mar. 2009. (8 pages).
Hollingsworth, et al. The Best Bits in an Iris Code. IEEE Transactions on Pattern Analysis and Machine Intelligence. INSPEC/IEEE. vol. 31, No. 6. Jun. 2009. pp. 964-973.
Nath, et al. IRISNET: An Architecture for Internet-Scale Sensing Devices. Proceedings of the 29th VLDB Conference. ACM Digital Library. 2003. (4 pages).
Ring, et al. Detection of Iris Texture Distortions by Analyzing Iris Code. 2nd IEEE International Conference on Biometrics: Theory, Applications and Systems, 2008. BTAS 2008. INSPEC/IEEE. Sep. 2008. pp. 1-6.
Bolle, R., et al. Iris Individuality: A Partial Iris Model. Proceedings of the 17th International Conference on Pattern Recognition (ICPR'04). vol. 2. Aug. 2004. pp. 927-930.
Broussard, R., et al. Identifying Discriminatory Information Content Within the Iris. In Proceedings SPIE Defense and Security Conference. International Institute of Informatics and Systemics. Mar. 2008. vol. 6944, pp. 69440: T1-T11.
Daugman, J., et al, How Iris Recognition Works. IEEE Transactions on Circuits and Systems for Video Technology. vol. 14, No. 1. Jan. 2004. pp. 21-30.
Daugman, J. The Importance of Being Random: Statistical Principles of Iris Recognition. The Journal of Pattern Recognition Society. Dec. 2001. pp. 279-291.
Daugman, J. Probing the Uniqueness and Randomness of Iris Codes: Results From 200 Billion Iris Pair Comparisons. Proceedings of the IEEE. vol. 94, No. 11. Nov. 2006. pp. 1927-1935.
Du, Y., et al. Analysis of Partial Iris Recognition. Presented at SPIE Defence and Security Symposium, 2004. Proceedings of the 2005 SPIE Defense and Security Symposium, vol. 5779. Mar. 2005. pp. 31-40.
Du, Y., et al. Analysis of Partial Iris Recognition Using 1-D Approach. In ICASSP '05: Proceedings of the International Conference on Acoustics, Speech, and Signal Processing. Mar. 2005. vol. 2. pp. ii/961-ii/964.
Fitzgibbon, A., et al. Direct Least Square Fitting of Ellipses. IEEE Transactions on Pattern Analysis and Machine Intelligence. vol. 21, No. 5. May 1999. pp. 476-480.
Hollingsworth, K, et al. The Best Bits in an Iris Code. IEEE Transactions on Pattern Analysis and Machine Intelligence. vol. 31, No. 6. Jun. 2009. pp. 964-973.
Monro, D.,et al. Rotation Compensated Human Iris Matching. Proc. IEEE Workshop on Signal Processing Applications for Public Security and Forensics. Apr. 2007. pp. 1-4.
Mukherjee, R., et al. Indexing Iris Images. In ICPR08. Appeared in Proc. of International Conference on Pattern Recognition (ICPR). Dec. 2008. pp. 1-4.
Roy, K., et al. Optimal Features Subset Selection Using Genetic Algorithms for Iris Recognition. Jun. 2008. pp. 894-904.
Sanchez, R., et al. Iris Recognition With Low Template Size. In AVBPA '01: Proceedings of the Third International Conference on Audio-and-Video-Based Biometric Person Authentication. Jun. 2001. pp. 324-329.
Wildes, R., et al. Iris Recognition: An Emerging Biometric Technology. Proceedings of the IEEE. vol. 85, No. 9, Sep. 1997. pp. 1348-1363.
Zuo, J., et al. A New Approach for Iris Segmentation. IEEE Computer Society Conference on Computer Vision and Pattern Recognition Workshops, Jun. 2008. pp. 1-6.
Office Action cited in corresponding U.S. Appl. No. 15/277,903 dated Nov. 30, 2017 (pp. 1-40).

* cited by examiner

SYSTEM AND METHOD FOR GENERATING AND EMPLOYING SHORT LENGTH IRIS CODES

BACKGROUND

Technical Field

The present invention relates to iris recognition and more particularly to systems and methods which employ a reduce iris code for more efficient iris comparisons.

Description of the Related Art

A texture of the human iris has been shown to have excellent individual distinctiveness and thus is suitable for use in reliable identification. A conventional iris recognition system unwraps the iris image and generates a binary feature vector by quantizing the response of selected filters applied to the rows of this image.

The iris may be segmented and unwrapped into a rectangular image. From the unwrapped iris, texture is extracted by applying a Gabor filter bank. This is encoded into a binary image, known as the iris code that serves as the feature vector for recognition. Some regions of the iris provide more consistent texture than others. For example, pupil dilation causes the pupil-adjacent texture to be particularly volatile, and the presence of eyelashes or eyelids can substantially alter an iris code's appearance if they are not properly masked out. Moreover, the radial unwrapping technique is tuned to over-sample the area closest to the pupil while under-sampling the region where the iris meets the sclera. The band in the middle iris provides a more personal description. This region maps to the ciliary zone of the iris.

There has been some work attempting to isolate regions of the iris code which are either inconsistent (fragile) or, conversely, less stable. These studies looked directly at the final binary representation. Inconsistent bits were discovered by analyzing several binary iris codes of the same eye and counting the number of times a bit was a one or a zero. When bits that had a high variability were masked out, the false reject rate was reduced. This work discovered a fragile bit mask for each person in a gallery.

Other researchers have examined the effect of smaller iris codes on recognition and generate an iris code from the outer and inner rings of the iris. These techniques empirically show that texture closer to the pupil may perform better in recognition than texture closer to the sclera. Similarly, sampling rates were adjusted to generate smaller iris codes. These approaches reduce the size of iris code by adjusting the way the iris is unwrapped, but these works fail to assert that any portion of the iris should be favored when dealing in the context of iris recognition.

There has been some work attempting to isolate regions of the iris code which are either inconsistent (fragile) or, conversely, more discriminative. These studies looked directly at the final binary representation. Inconsistent bits were discovered by analyzing several binary iris codes of the same eye and counting the number of times a bit was a one or a zero. Sampling rates are adjusted to generate smaller iris codes. However, these approaches reduce the size of iris code by adjusting the way the iris is unwrapped. These techniques change the format of the code, which impairs the backward compatibility of the representation (e.g. with regards to rotation compensation).

SUMMARY

A system and method for generating compact iris representations based on a database of iris images includes providing full-length iris codes for iris images in a database, where the full-length iris code includes a plurality of portions corresponding to circumferential rings in an associated iris image. Genuine and imposter score distributions are computed for each row in the full-length iris codes, and code portions are identified that have a contribution that provides separation between imposter and genuine distributions relative to a threshold. A correlation between remaining code portions is measured to estimate a proper sampling rate. A subset of code portions having low correlations within the subset is generated to produce a compact iris representation.

A system for generating compact iris representations based on a database of iris images includes a database configured to store full-length iris codes for all iris images, where each iris code includes a plurality of portions corresponding to circumferential rings in an associated iris image. A processor is configured to compute genuine and imposter score distributions for the portions of iris codes and determine which code portions of the iris codes provide a highest contribution to a separation between imposter and genuine distributions, the processor being configured to measure a correlation between the remaining code portions to determine a subset of the code portions having lowest correlations within the subset such that a compact iris representation is generated from the subset.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
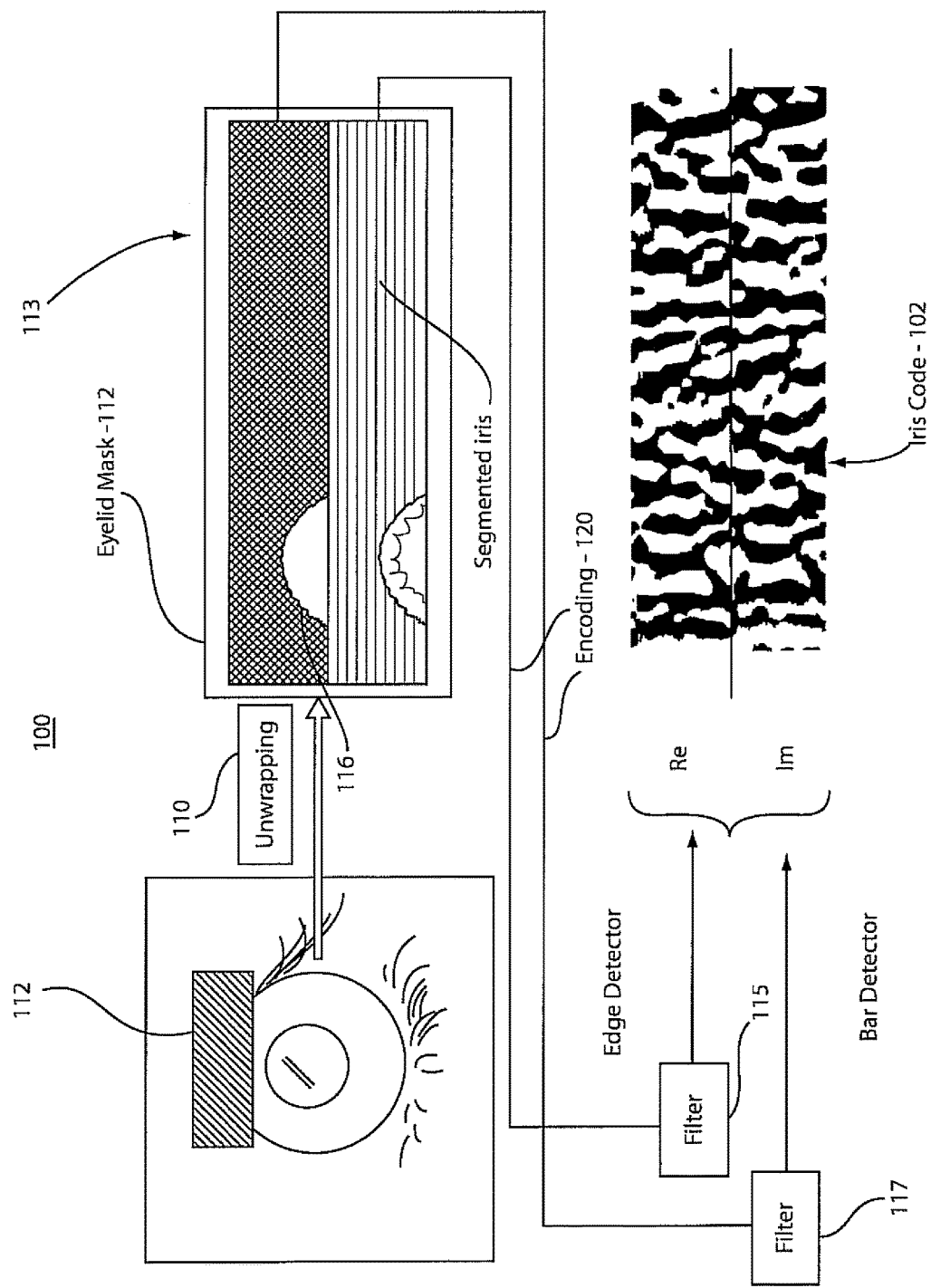
FIG. 1 is a diagram showing generation of iris codes.

In accordance with the present principles, iris code is reduced by locating high discriminatory information regions in the iris. A resulting transformation reduces the size of the iris code. A short-length iris code (SLIC) is achieved, which, in one embodiment, is at least 12.8 times smaller than a full-length iris codes (FLIC). The present principles seek to shrink an iris representation by finding those regions of the iris that contain the most descriptive potential. The present inventors show through experiments that the regions close to the pupil and sclera contribute least to discrimination, and that there is a high correlation between adjacent radial rings.

Using these observations, a short-length iris code (SLIC) of only 450 bytes is achieved. The SLIC is an order of magnitude smaller than the FLIC and yet has comparable performance. The smaller sized representation has the advantage of being easier to store as a barcode, and also reduces the matching time per pair. The present principles use statistical techniques to reduce the size of a standard, rectangular sampled iris code. Maintaining the same format enhances the backward compatibility of the representation (e.g., with regards to rotation compensation) while smaller codes mean faster systems and reduced storage requirements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, an iris code 102 is an individual descriptor in an iris recognition system 100. The iris code 102 is a binary image that encodes a texture of the iris. The various stages in the generation of an iris code include unwrapping the iris in block 110, computing an eyelid mask in block 112, and generating the full length iris code 102. To generate an iris code, the iris is first segmented from an image and non-rigidly unwrapped into a rectangular template 113. Then, two filter masks 115 and 117 are convolved over the unwrapped iris (encoding 120) and the sign of each pixel's response is used to encode that pixel. The collective responses to the odd filter 115 are referred to as the real (RE) portion of the iris code, and the responses to the even filter 117 are known as the imaginary (IM) portion (e.g., edge detection kernel and bar detection kernel filters respectively). In the event that a pixel is occluded by an eyelid in the original image (e.g., a "bite" 116), that pixel is removed from comparison in the iris code. There are many variants on this scheme.

In recognition, two iris codes are said to match (correspond to the same eye) if the normalized Hamming distance between them is less than a pre-defined threshold. The normalized Hamming distance is the number of unmasked bits that differ between the codes divided by the total number of unmasked bits. The equation for the Normalized Hamming distance between two iris codes with occlusion masks is:

$$HD(A, B) = \frac{\| (A \oplus B) \wedge A_{mask} \wedge B_{mask} \|}{\| A_{mask} \wedge B_{mask} \|}. \quad (1)$$

An iris recognition system 100 also needs to compensate for changes in rotation by aligning iris codes. Two codes of the same eye can differ because of head tilt relative to the camera at the time of acquisition.

Figure 2:
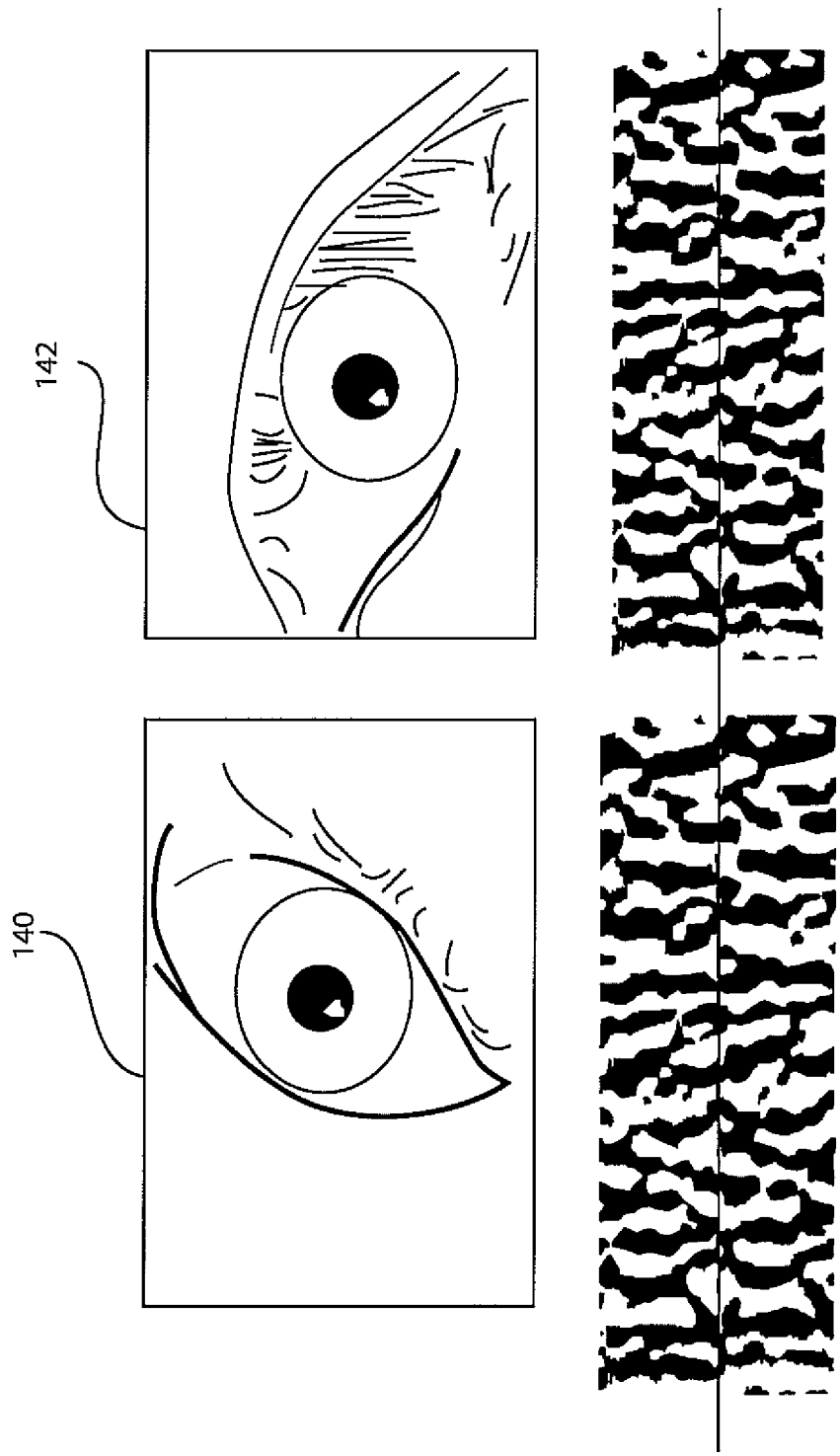
FIG. 2 shows an example of two eye rotations.

Referring to FIG. 2, two instances (140 and 142) of a same eye with drastically different tilts is illustratively shown. To correct for relative rotations between the members of a valid pairs, the Hamming distance is calculated at every possible linear shift (equivalent to a fixed rotation) of one iris code relative to the other within a defined rotation range. The codes are said to be aligned when the distance between them is minimized, and it is this distance which is used as the match score.

In a 1:N (identification) system, a probe iris code is matched with each element in a gallery (database of individuals). The identity of the probe is assigned by its distance to a gallery instance. This is a computationally expensive operation and grows linearly as larger gallery sets are considered.

The number of bit operations is:

$$b_{ops} = N \cdot h \cdot w \cdot \theta \quad (2)$$

where h is the height of the iris code, w is its width, $\theta$ is number of shifts for alignment correction and N is the number of gallery images. When h=128, w=360, $\theta$=20 and N=10,000 (a moderate size database), the number of bit operations is 18 billion. Reducing the number of features in the iris code or the gallery size will reduce the number of bitwise operations and thus speed up an identification system. Notice that reducing the height of the iris code by an order of magnitude will result in a matching system that is an order of magnitude faster.

The present principles reduce the size of the iris code without substantially impairing performance. This is done by locating and extracting the global texture which best encodes identity. The basic methods are independent of the dataset, segmenter, or encoding used.

LOCATING DISCRIMINATORY INFORMATION: An iris recognition system (100) determines a match by thresholding the distance between two aligned codes. The distances between mated pairs should be less than the distances between unmated pairs. A mated pair is a set of two codes from the same eye whereas an unmated pair is a set of two codes from different eyes. The mated and unmated distributions of Hamming distances (score distributions) are used to visualize the potential operation of a recognition system.

Figure 3A:
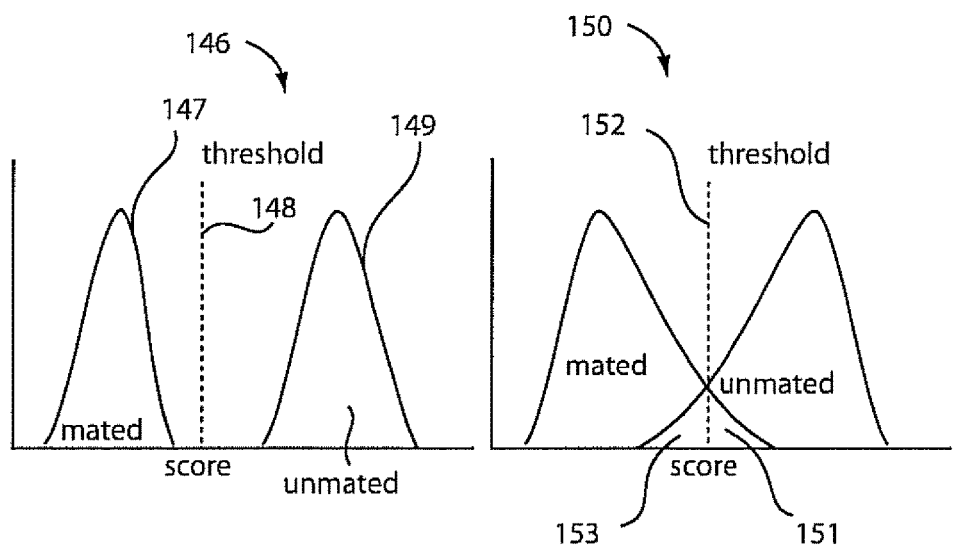
FIG. 3A shows plots of score distributions for mated and unmated irises.
Figure 3B:
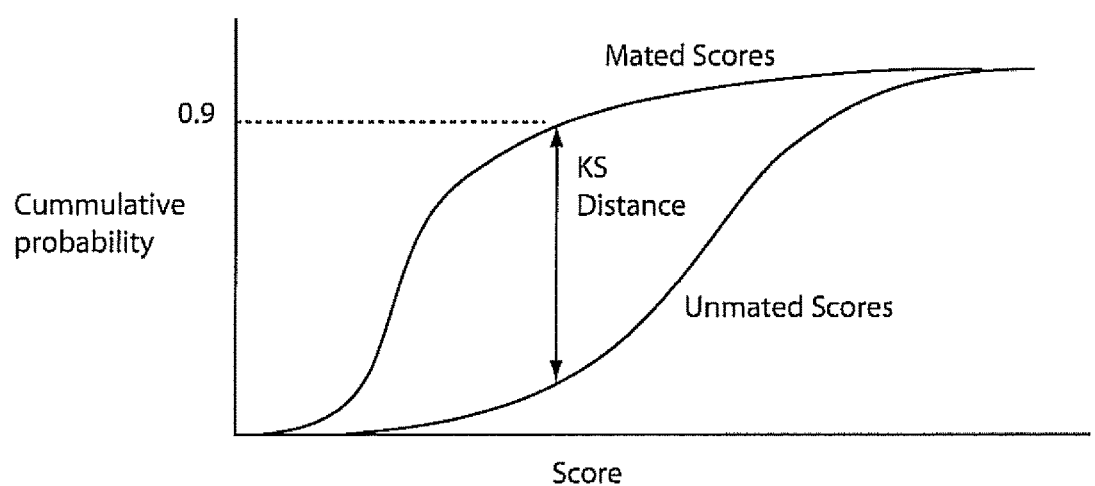
FIG. 3B shows a plot of cumulative probability versus score for mated and unmated scores also showing a 0.90 KS distance.

Referring to FIGS. 3A and 3B, two sets of mated and unmated score distributions are depicted. In a good recognition system 146, all mated scores 147 are below a decision threshold 148 and unmated scores 149 are above the threshold 148. In a poor recognition system 150, there are mated scores 151 above a decision threshold 152 and unmated scores 153 below the threshold 152. Iris comparisons that map to these regions 151 and 153 of the histograms will thus cause errors.

In FIG. 3B, the discriminatory capacity of each row is its ability to contribute to the overall separation between the mated and unmated score distributions. We propose Kolmogorov-Smirnov (KS) analysis to measure each row's capacity. KS analysis returns the distance between cumulative distribution functions (CDFs) at a given point along the domain. Expressed in an equation:

$$KS(row_i) = CDF_M(row_i) - CDF_{NM}(row_i) \quad (3)$$

where $CDF_M$ and $CDF_{NM}$ are the cumulative distributions for the mated and non-mated scores, respectively. For our work, we measure the difference in mated and unmated CDFs when the mated CDF is at 0.9 (i.e. 90% of the mated pairs have distances below this threshold). In terms of recognition, the KS distance is the true-negative rate when the true positive rate is 09.

We hypothesize that the KS distance for various regions of the iris will be different. The area close to the pupil is volatile because it fluctuates with dilation (or inaccurate segmentation) so it will have less discriminatory capacity.

Figure 4:
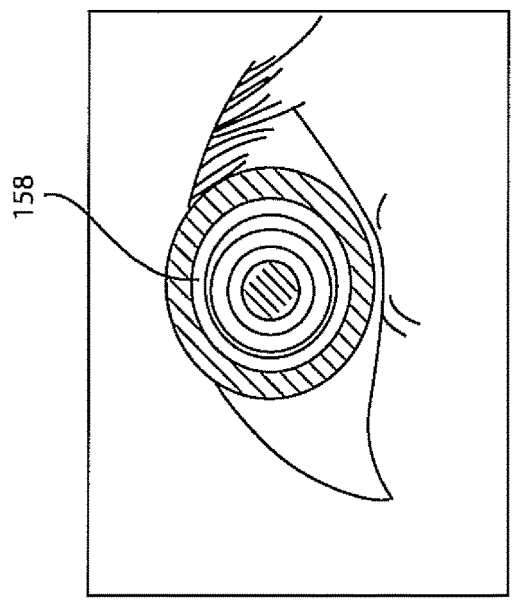
FIG. 4 is a plot for an eye image showing distribution separation versus iris location and further depicting a region of interest having a highest separation.
Figure 4:
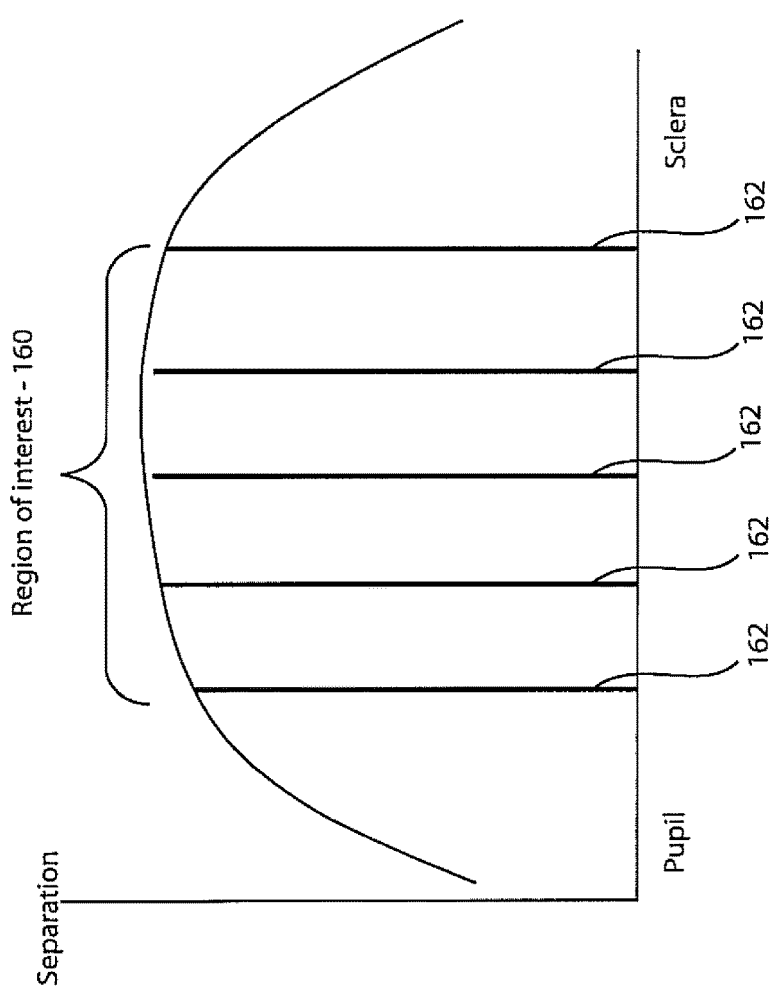

Referring to FIG. 4, a band 158 in the middle of an iris will have high information content (region of interest) because it is rich in largely static texture. The region closest to the sclera lacks texture so it will likely have a lower value (it can also be more variable due to inaccurate unwrapping). The regions with the highest individual KS scores give the largest contributions to a separation between full distributions and are therefore the most valuable for recognition.

The KS analysis will highlight a broad annular region of interest 160 within the iris. This region of interest 160 can be further reduced by subsampling the texture therein to determine subsamples 162. In particular, one row of the iris code (ring) may not be much different than the row above or beneath it. To properly subsample the region of interest 160, however, we need to understand the locality of texture. To do this we measure the correlation of each row in the iris code with all other rows. The correlation measure we use is simply:

$$Cor_{(i,j)} = 1 - \frac{\|(row_i \oplus row_j) \wedge mask_i \wedge mask_j\|}{\|mask_j \wedge mask_i\|} \quad \text{or,} \quad (4)$$

equivalently, $$Cor_{(i,j)} = 1 - HD(row_i, row_j) \quad (5).$$

The correlation analysis shows high local correlation between nearby rows up to a certain distance. The width of the correlation neighborhood will thus dictate the proper row sampling rate.

Using the analysis methodology above, we develop a transform that takes a full-length iris code (FLIC) into a short-length iris code (SLIC). The initial KS analysis will highlight a region of interest, and uniform sampling of that region will extract the features which best encode identity. The samples will be rich in global texture and high in discriminatory capacity. The resulting SLIC will have a smaller footprint leading to faster recognition, and should have approximately the same performance.

Figure 5:
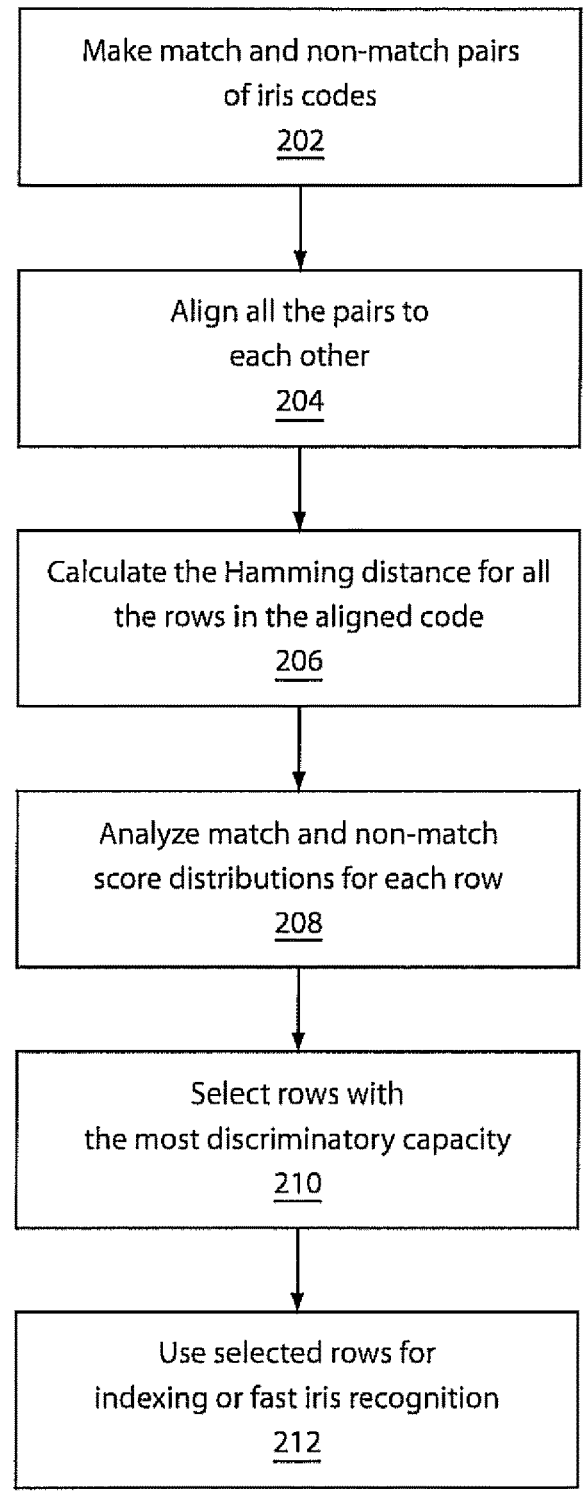
FIG. 5 is a block/flow diagram of a system/method for creating compact iris codes in accordance with one embodiment.

Referring to FIG. 5, a block/flow diagram showing construction of a SLIC from a FLIC is illustratively shown. A known dataset was used to test our proposed method. This database had 5 images of 92 eyes. To generate the iris codes from these images we first segmented and unwrapped the irises. All the images in the database were segmented. A visual inspection of the unwrapped textures and masks removed instances of poor segmentation. The resulting database was a subset with 85 eyes which the authors determined to be adequately segmented and encoded.

From the unwrapped irises, the texture was extracted with a bank of 1D log Gabor filters. The initial unwrapped iris images were 360×64 pixels and the iris codes were 360×128. Half of this full-length iris code (FLIC) corresponded to the real portion and half to the imaginary portion from the filter bank.

The "clean" subset was further partitioned into training and testing sets. The training set was used for all the analyses in the following section, whereas the testing set was withheld to further validate our predictions. A total of 23 eyes (115 codes) were used for inferring statistics. All 85 eyes were then used for testing.

In block 202, the parameters of the FLIC-to-SLIC transform is determined by first generating an all-aligned-pairs set. This includes making mated and unmated pairs of iris codes. In block 204, from the 115 codes, alignments for all pairs (both from the same individual and from different people) were found. In block 206, a Hamming distance is computed for all rows in the aligned code. In block 208, the minimum Hamming distance is used as a criterion, and a compensation range of up to 180 degrees is used to analyze match and non-match score distributions for each row, (e.g., shift one code relative to the other such that the normalized Hamming Distance is minimized). If the distance between two codes is small, they are said to come from the same eye of the same person. Normalized Hamming distance is used where the number of different bits over number of total bits is determined. Pairs of codes that originated from the same eye were labeled mated and pairs which came from different eyes were labeled unmated.

In block 210, the discriminatory capacity for each row in the iris code is measured by KS analysis as described by Equation 3. Both the real and imaginary portions of the iris code have the same general shape in this plot. The regions close to the pupil and sclera are shown to have less discriminatory capacity than the rows mapping to the middle region of the iris. From this plot, e.g., we could determine that our primary region of interest is between rows 10 and 52 of both the real and imaginary portion of the iris code. The rows with the most discriminatory capacity are selected. In block 212, the selected rows are employed for indexing or fast iris recognition.

Figure 6:
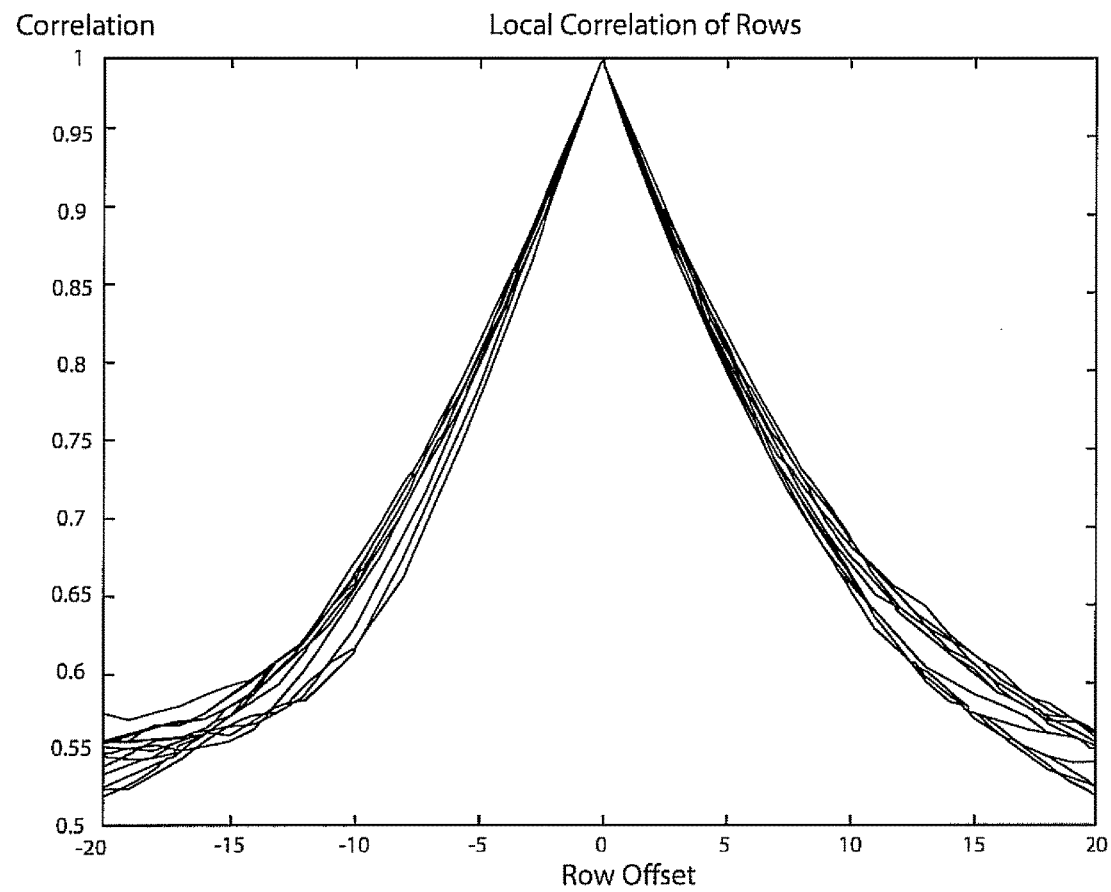
FIG. 6 is a plot of a correlation measure versus row offset to show local correlation of rows.

We theorized that evenly sampling the region of interest would be sufficient. To prove this, and determine an adequate sampling rate, we inspected local correlations of textural patterns in the iris code. A correlation matrix was generated for the all-rows for each iris code in the training set. An average correlation matrix was generated by averaging each element of the matrix across all the training instances. A projection around the major diagonal was then used to generate the plot in FIG. 6. It can be seen from this plot that the correlation drops off after about 10 rows, suggesting that rows this far apart contain substantially different information.

Figure 7:
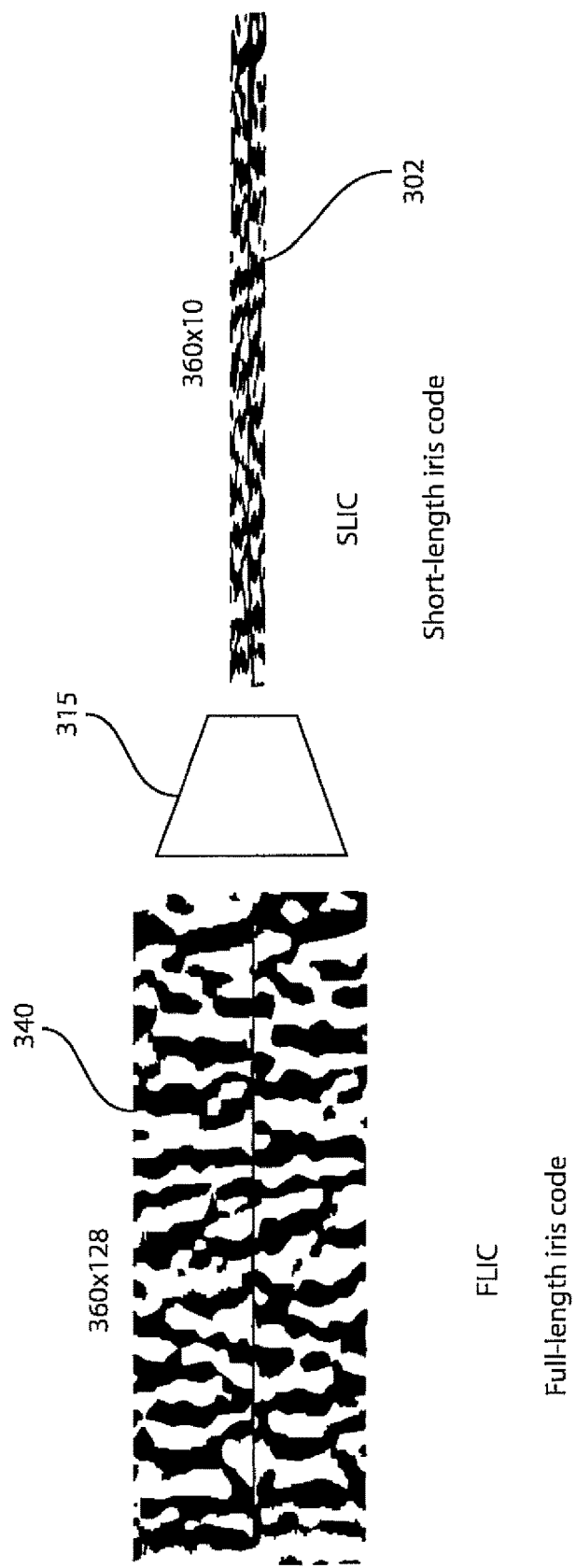
FIG. 7 is a diagram showing a FLIC transformed into a SLIC in accordance with one embodiment.

Referring to FIG. 7, a short iris representation 302 is illustratively depicted. The short-length iris code (SLIC) transform 315 is a code-level operation which preferably samples a middle band of the iris. The SLIC 302 is generated by locating and extracting regions of the iris code with high discriminatory capacity, meaning that these rows most contribute to separating matches from non-matches. Because of the physiology of the pupil, "useful" rows are identified in the code.

From a set of training iris code pairs, Kolmogorov-Smirnov analysis is preferably performed to locate the rows of the iris code with the most information content. A center portion of the iris, mapping to the middle rows of the iris code, was found by the present inventors to be a region where the bulk of the discriminatory texture resided. The rows in this region are then evenly sampled to make the new, shorter iris code. In one example, the FLIC 340 (360×128 pixels) is reduced to 360×10 pixels in the SLIC 302.

To the select the "useful" rows, we use a training data set. Using an available iris image analysis tool, we produce the full length iris codes (FLIC) 340. From the FLIC 340, the present method produces a SLIC 302. The information about how to produce the SLIC from the FLIC is learned from the training set. Once the process has been learned, we can use it in a matching process of the iris code using SLIC itself.

By applying the method, one can reduce the iris code size significantly by eliminating redundant rows that do not contribute much to the decision making process. In experiments, this invention gives iris codes that are 10× smaller than the original (e.g., FLIC=360×64×2=5760 bytes versus SLIC=360×5×2=450 bytes) but with approximately the same matching accuracy. This allows iris codes to be stored in smaller formats such as 2D barcodes. The methods can also be used to match iris codes faster since there are fewer bits to compare.

Therefore, a system and method of generating smaller, yet still effective, iris codes has been described. KS statistics have illustratively been employed to analyze the discriminatory capacity of different rows in the iris code. The analysis revealed rows 10 to 52 as contributing most to the separation of mated and non-mated score distributions. We then used an autocorrelation index to reduce the iris code size even more by sampling rows within this region (e.g., every 10th was sufficient). It was empirically shown for the tested dataset that the resulting short length iris codes maintain accuracy comparable to the full length iris codes. Since the code size is reduced by an order of magnitude, the overall system is correspondingly faster and uses less memory. The derived compact codes are also more easily stored in smart cards, magnetic strips, 2D barcodes, etc. It should be noted that in convention systems there is a problem of storing iris codes on portable media, such as ID cards. A typical magnetic stripe holds several hundred bytes while a 2D barcode is limited a few thousand bytes. Current iris codes do not fit on magnetic stripes and push the limits of 2D barcode technology. Smart cards can hold several thousand bytes, but typically not the 5.76 Kb needed by a full length iris code (360×128).

Figure 8:
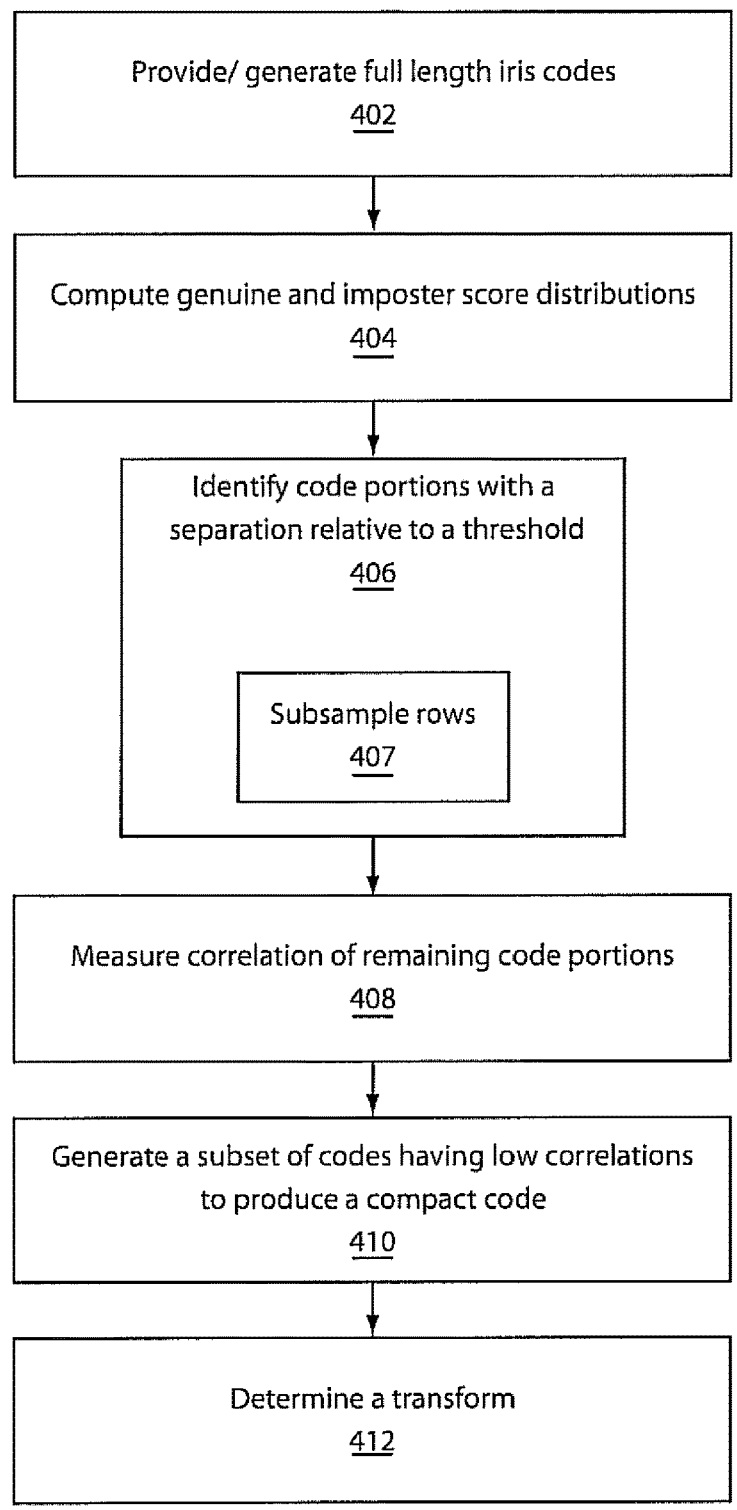
FIG. 8 is a block/flow diagram of a system/method for creating compact iris codes in accordance with another embodiment.

Referring to FIG. 8, a method for generating compact iris representations based on a database of iris images is illustratively shown in accordance with one embodiment. In block 402, full-length iris codes for iris images are generated or provided in a database, where the full-length iris code includes a plurality of portions corresponding to circumferential rings in an associated iris image. This preferably includes a region of interest between a pupil and a sclera in the iris code.

In block 404, genuine and imposter score distributions are computed for the full-length iris codes. (See e.g., FIG. 3). In block 406, code portions are identified that have a contribution that provides separation between imposter and genuine distributions relative to a threshold. This may include computing a Hamming distance for all rows in an aligned code where a minimum Hamming distance is used as a criterion to analyze genuine and imposter score distributions for each row. Code portions in rows of an iris code are preferably identified for both a real and imaginary portion of the iris code (e.g., between a pupil and a sclera in the iris code, and more particularly between, e.g., rows 10 and 52). In block 407, subsampling rows in a region of interest may be performed to further reduce computational complexity.

In block 408, a correlation is measured between remaining code portions. In block 410, a subset of code portions is generated having low correlations within the subset to produce a compact iris representation. This includes determining a discriminatory capacity for rows in an iris code. Rows in an iris code having highest discriminatory capacity for the subset are selected. The discriminatory capacity may be measured by a Kolmogorov-Smirnov (KS) analysis.

In block 412, using the information learned in this method parameters of a full length iris code to compact iris code transform may be determined. This provides a method by which all full length codes can easily be converted. By generating an all-aligned-pairs set information may be gleaned which assist in determining the best rows or locations to employ to create the best compact iris code.

Figure 9:
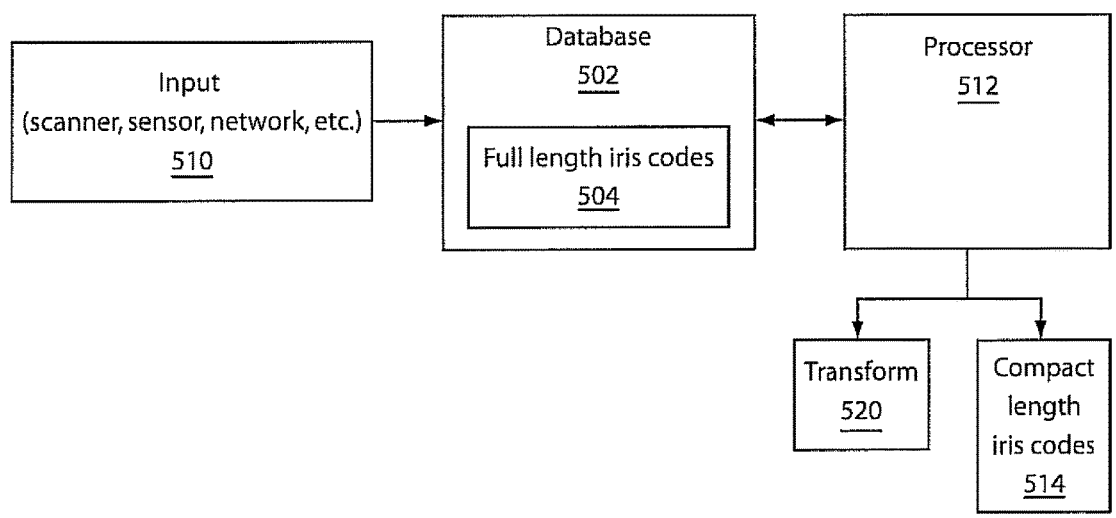
FIG. 9 is a block/flow diagram of a system for generating compact iris codes in accordance with a useful embodiment.

Referring to FIG. 9, a system 500 for generating compact iris representations based on a database of iris images is illustratively shown. System 500 may be employed to transform FLIC codes to SLIC codes, or may be employed to generate a transform for performing this task. System 500 includes a database 502 configured to store full-length iris codes 504 for all iris images. Each iris code 504 includes a plurality of portions corresponding to circumferential rings in an associated iris image. The images may be gathered in the database 502 using a scanner or sensor 510, although the images may be downloaded from a memory device, a network, etc.

A processor 512 is configured to compute genuine and imposter score distributions for the iris codes and determine which code portions of the iris code provide a highest contribution to a separation between imposter and genuine distributions. This separation indicates distinctiveness. The processor 512 is also configured to measure a correlation between the remaining code portions to determine a subset of code portions having lowest correlations within the subset such that a compact iris representation 514 is generated from the subset. The subset information provides highly discriminatory code data used to reduce the size of the full length codes with any significant compromising of accuracy. The compact codes may be loaded onto a device, such as a handheld computing device, an electronic device or any device where security or the identity of the user needs to be determined. The compact iris codes reduce the amount of memory space needed to store an iris code. This opens up the possibility of using iris recognition in devices previous not capable of using such a technology due to memory limitations.

In one embodiment, the system 500 generates a transform 520 to generate compact iris codes. The transform 520 converts a full length iris codes to a compact iris code based upon information learned determining high discrimination information. The transform 520 may be employed in other devices to convert FLICs to SLICs. This provides an easy way to convert FLIC databases. The transform 520 may be reversible.

Having described preferred embodiments of a system and method for generating and employing short length iris codes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating compact iris representations to reduce the amount of memory space needed based on a database of iris images, the method comprising:

generating full-length iris codes for the iris images in the database, wherein the full-length iris code is a binary image that encodes a texture of an associated iris image obtained from a human iris, by segmenting the iris images, non-rigidly unwrapping the segmented images into a rectangular template of row x column pixels, and convolving two filter masks over the unwrapped segmented image;

computing genuine and imposter score distributions for full-length iris codes for iris images in the database using a processor, where the full-length iris codes include a plurality of portions corresponding to circumferential rings of the human iris in the associated iris image;

identifying and retaining code portions that have a contribution that provides separation between imposter and genuine distributions relative to a threshold, wherein identifying code portions includes computing a Hamming distance for all rows in an aligned code to correct for relative rotations, where a minimum Hamming distance is used as a criterion to analyze genuine and imposter score distributions for each row;

measuring a correlation between remaining code portions using a processor by measuring the correlation of each row;

generating a subset of the remaining code portions having low correlations within the subset to produce the compact iris representation that uses less memory; and storing the compact iris representation into a memory of a computing device.

2. The method as recited in claim 1, further comprising determining parameters of the full length iris code to compact iris code transform by generating an all-aligned pairs set.

3. The method as recited in claim 1, wherein the separation is based upon a discriminatory capacity for rows in the full length iris code.

4. The method as recited in claim 3, wherein discriminatory capacity is measured by a Kolmogorov-Smirnov (KS) analysis.

5. The method as recited in claim 1, wherein generating a subset includes selecting rows in the full length iris code having highest discriminatory capacity for the subset.

6. The method as recited in claim 5, wherein discriminatory capacity is measured by a Kolmogorov-Smirnov (KS) analysis by locating rows of the iris code with the most information content.

7. The method as recited in claim 1, wherein identifying code portions includes identifying code portions in rows of the full length iris code for both a real and imaginary portion of the full length iris code.

8. The method as recited in claim 1, wherein generating a subset of code portions includes subsampling rows in a region of interest between rows 10 and 52 of the full length iris code.

9. The method as recited in claim 1, wherein generating a subset includes computing a Hamming distance between two portions from a same iris image and taking an average of this distance over the iris images in the database.

* * * * *